(12) United States Patent
Wieczorek et al.

(10) Patent No.: US 12,244,180 B2
(45) Date of Patent: Mar. 4, 2025

(54) ELECTROMAGNETIC POLE FOR A ROTARY ELECTRIC MACHINE AND ROTOR AND ROTARY ELECTRIC MACHINE COMPRISING SUCH AN ELECTROMAGNETIC POLE

(71) Applicant: Valeo eAutomotive Germany GmbH, Erlangen (DE)

(72) Inventors: Christoph Wieczorek, Bad Neustadt a.d.Saale (DE); Florian Volkmuth, Bad Neustadt a.d.Saale (DE); Sebastian Beetz, Bad Neustadt a.d.Saale (DE); Nikolas Seubert, Bad Neustadt a.d.Saale (DE); David Förster, Bad Neustadt a.d.Saale (DE); Christoph Englert, Bad Neustadt a.d.Saale (DE); Carsten Siepker, Bad Neustadt a.d.Saale (DE); Nico Wolf, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 259 days.

(21) Appl. No.: 18/145,249

(22) Filed: Dec. 22, 2022

(65) Prior Publication Data

US 2023/0208220 A1      Jun. 29, 2023

(30) Foreign Application Priority Data

Dec. 23, 2021   (EP) ..................................... 21217548

(51) Int. Cl.
*H02K 1/24*      (2006.01)
*H02K 3/18*      (2006.01)
*H02K 3/52*      (2006.01)

(52) U.S. Cl.
CPC ................. *H02K 1/24* (2013.01); *H02K 3/18* (2013.01); *H02K 3/527* (2013.01)

(58) Field of Classification Search
CPC ............. H02K 1/24; H02K 3/18; H02K 3/527
USPC .................................................. 310/216.091
See application file for complete search history.

(56) References Cited

U.S. PATENT DOCUMENTS

| | | | | |
|---|---|---|---|---|
| 10,644,569 | B2 * | 5/2020 | Lee ......................... | H02K 3/527 |
| 11,218,064 | B2 * | 1/2022 | Herrmann ................ | H02K 3/18 |
| 2004/0056555 | A1 * | 3/2004 | Fujinaka ................. | H02K 21/22 |
| | | | | 310/67 R |
| 2016/0233730 | A1 * | 8/2016 | Ho .......................... | H02K 1/146 |
| 2023/0208220 | A1 * | 6/2023 | Wieczorek ............... | H02K 1/24 |
| | | | | 310/216.091 |

(Continued)

*Primary Examiner* — Rashad H Johnson
(74) *Attorney, Agent, or Firm* — Osha Bergman Watanabe & Burton LLP

(57) ABSTRACT

An electromagnetic pole (17) for a rotary electric machine is disclosed. The pole has a tooth (18) comprising a tooth body (19), the tooth (18) being radially oriented and the tooth (18) comprising a recess (21), a coil (16) comprising a plurality of wire turns (20) wound around the tooth (18) between a first radial end (28) and a second radial end (29), the wire turns (20) which are the most distant from the tooth body (19) between the first radial end (28) and the second radial end (29), forming an outer wire layer (22), the coil (16) comprising a bracing wire (14), the bracing wire (14) being wound on the outer wire layer (22) from the first radial end (28) to the second radial end (29) in less than one turn around the tooth (18) so as to hold in position the outer wire layer (22).

13 Claims, 5 Drawing Sheets

(56) References Cited

U.S. PATENT DOCUMENTS

Figure 1:
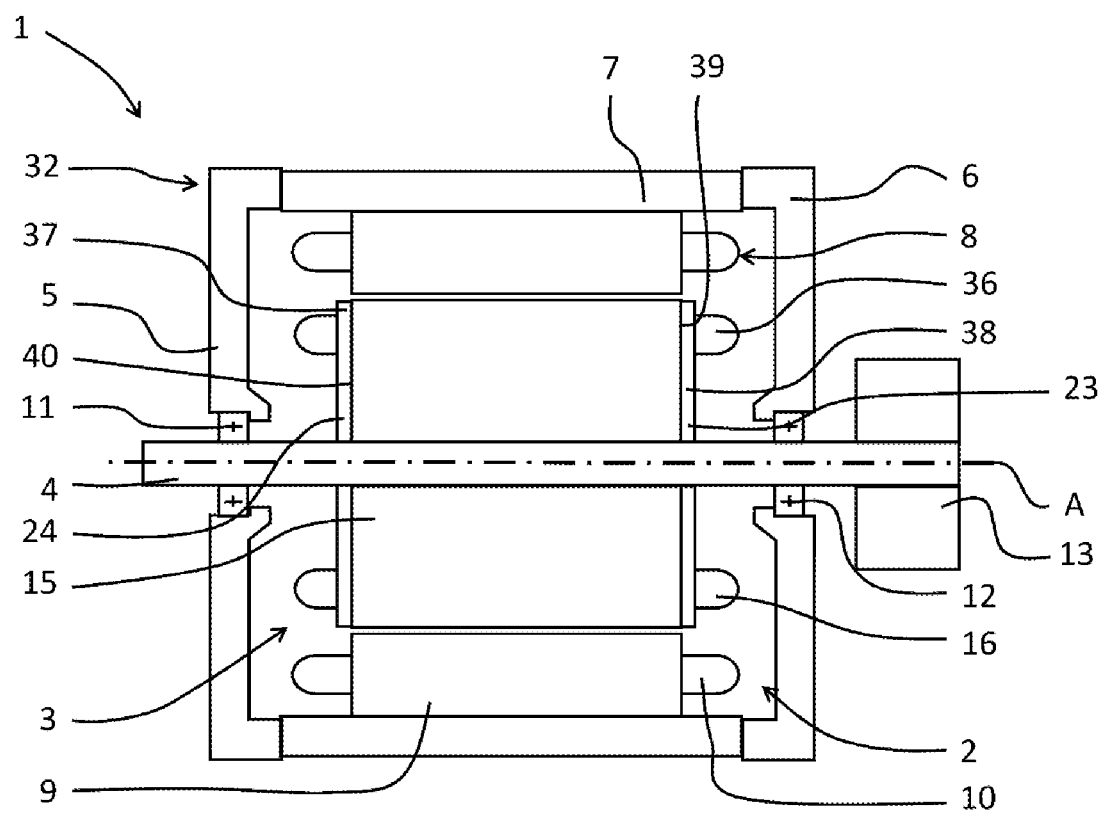

| | | | |
|---|---|---|---|
| 2023/0208226 A1* | 6/2023 | Wieczorek | H02K 15/022 310/216.074 |
| 2023/0208264 A1* | 6/2023 | Akkaya | H02K 3/28 310/208 |

* cited by examiner

ELECTROMAGNETIC POLE FOR A ROTARY ELECTRIC MACHINE AND ROTOR AND ROTARY ELECTRIC MACHINE COMPRISING SUCH AN ELECTROMAGNETIC POLE

The present invention relates to an electromagnetic pole for a rotary electric machine. The present invention also relates to a rotor comprising such electromagnetic poles and a rotary electric machine comprising such a rotor.

In a known manner, an electromagnetic pole for a rotary electric machine with an axis of rotation such as an electromagnetic pole of a rotor comprises:
- a tooth comprising a tooth body comprising a magnetic material, in particular a laminated tooth body comprising a plurality of steel plate stacked in the direction of the axis of rotation, the tooth being radially oriented and the tooth comprising a recess between a first radial end and a second radial end,
- a coil comprising a plurality of wire turns wound around the tooth between the first radial end and the second radial end,
- the wire turns which are the most distant from the tooth body between the first radial end and the second radial end, forming an outer wire layer.

With such an electromagnetic pole, there is a risk that the wire turns of the outer wire layer are unstable and slip off. This risk is even higher if the coil has a trapezoidal shape. This risk of slip of wire turns requires to increase the free space between the coils of adjacent electromagnetic poles leading to an increase of the size of the rotary electric machine or a reduction of the performances of the rotary electric machine.

The objective of the invention is to reduce or eliminate these disadvantages.

The present invention relates to an electromagnetic pole for a rotary electric machine with an axis of rotation comprising:
- a tooth comprising a tooth body comprising a magnetic material, in particular a laminated tooth body comprising a plurality of steel plate stacked in the direction of the axis of rotation, the tooth being radially oriented and the tooth comprising a recess,
- a coil arranged in the recess, the coil comprising a plurality of wire turns wound around the tooth between a first radial end and a second radial end,
- the wire turns which are the most distant from the tooth body between the first radial end and the second radial end, forming an outer wire layer,
- the coil comprising a bracing wire, the bracing wire being wound on the outer wire layer from the first radial end to the second radial end in less than one turn around the tooth so as to hold in position the outer wire layer.

Thanks to such a bracing wire, the turns of the outer wire layer are held and stay in position. The risk of slippage of turns of the outer wire is thus reduced. Hence less free space between the coils of adjacent electromagnetic poles is needed. Therefore the performance of the rotary electric machine can be increased by using bigger coils with more turns and/or the size of the rotary electric machine can be reduced.

According to a further development of the present invention, the outer wire layer comprises at least seven wire turns.

According to a further development of the present invention, the coil comprises a first coil part starting at the second radial end and ending at a third radial end, the third radial end being between the second radial end and the first radial end, the size of the wire turns of the outer wire layer increasing from the second radial end to the third radial end.

Thanks to such a coil shape, the number of turns can be increased even is the electromagnetic pole is an electromagnetic pole for a rotor of a rotary electric machine with a low number of poles such as four or six. Therefore the performance of the rotary electric machine can be increased. The bracing wire makes it possible to use such a coil shape while preventing the slippage of turns of the outer wire layer.

According to a further development of the present invention, the coil comprises a second coil part starting at the first radial end and ending at a fourth radial end, the fourth radial end being between the first radial end and the third radial end, the size of the wire turns of the outer wire layer increasing from the first radial end to the fourth radial end.

According to a further development of the present invention, the tooth body comprises a first axial end and a second axial end and wherein the tooth comprises a first end plate bearing against the first axial end.

According to a further development of the present invention, the bracing wire is wound on the outer wire layer from the first radial end to the second radial end at a location axially offset from the first axial end on the side of the first end plate.

According to a further development of the present invention, the coil comprises a tying portion extending from the bracing wire beyond the second radial end, and wherein the first end plate comprises a first fastening pin, the tying portion being at least partially wound around the first fastening pin.

Thanks to such a first fastening pin and such a tying portion, the bracing wire is tensioned on the outer wire layer and the turns of the outer wire layer are retained securely in place.

According to a further development of the present invention, the first fastening pin extends in the axial direction.

According to a further development of the present invention, the first end plate comprises a second fastening pin extending in the axial direction, the tying portion being at least partially wound around the second fastening pin.

According to a further development of the present invention, the tying portion has a S-shaped path between the first fastening pin and the second fastening pin. Thanks to such a second fastening pin and such a S-shaped path, the bracing wire is even better tensioned on the outer wire layer The invention also relates to a rotor for rotary electric machine with an axis of rotation comprising a plurality of electromagnetic poles as were described above.

According to a further development of the present invention, the number of electromagnetic poles is at least equal to four in particular the number of electromagnetic poles is equal to six.

The invention also relates to a rotary electric machine with an axis of rotation comprising a rotor as was described above.

The invention will be better understood by reading the following description and examining the figures which accompany it. These figures are provided purely by way of illustration and in no way limit the invention.

FIG. 1 is a schematic view in transverse cross-section of the rotary electrical machine according to the invention; and.

Figure 2:
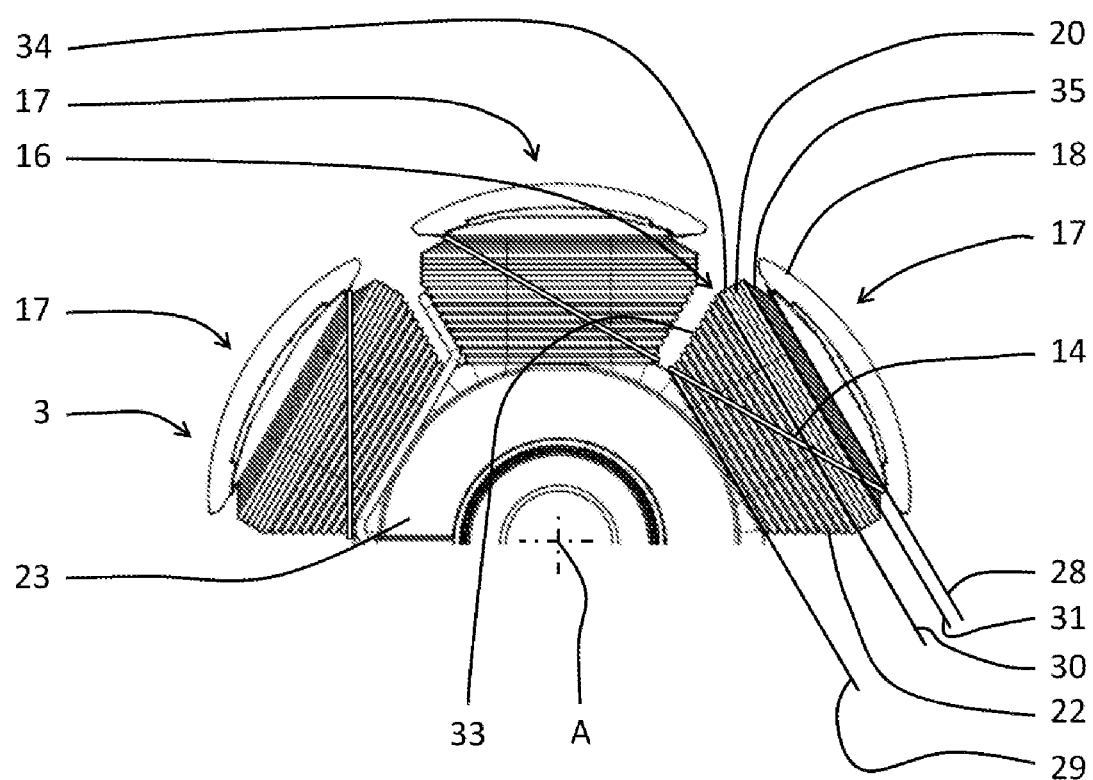
Figure 3:
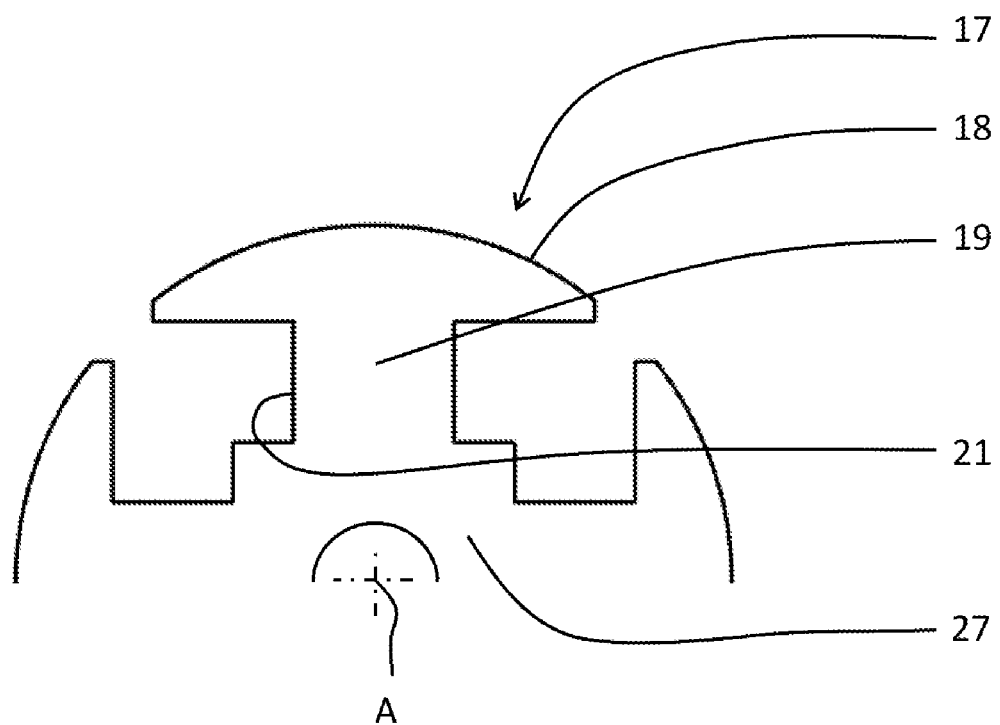
Figure 4:
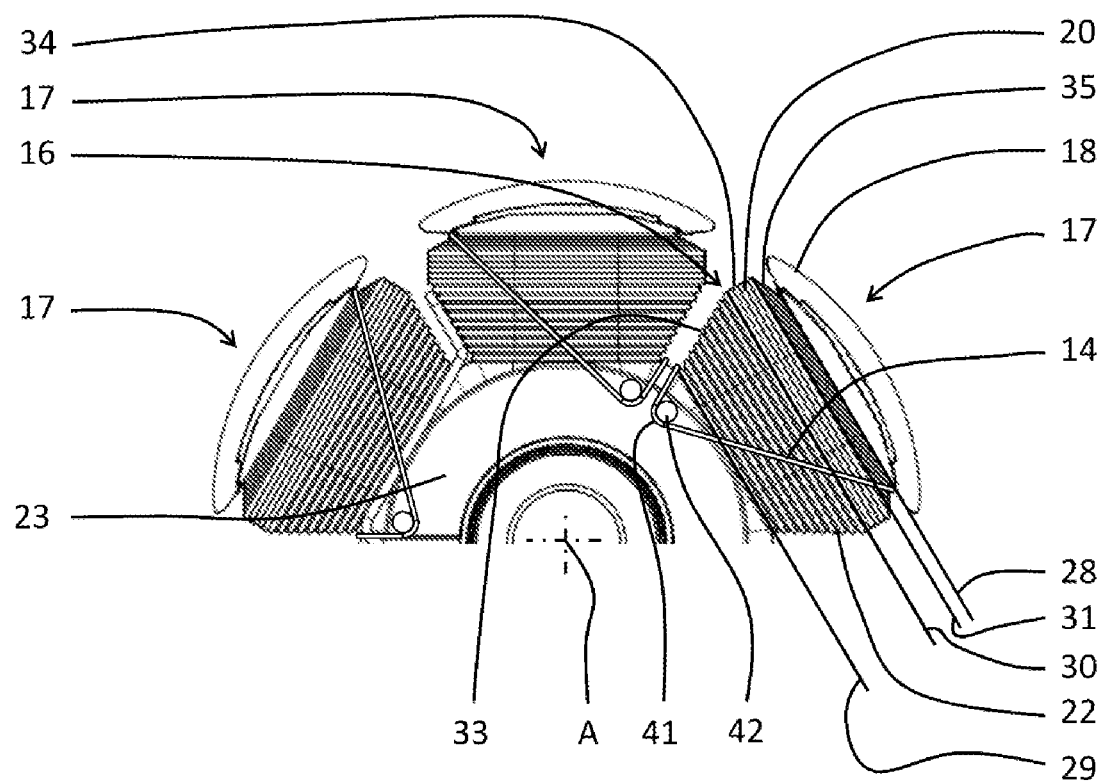
Figure 5:
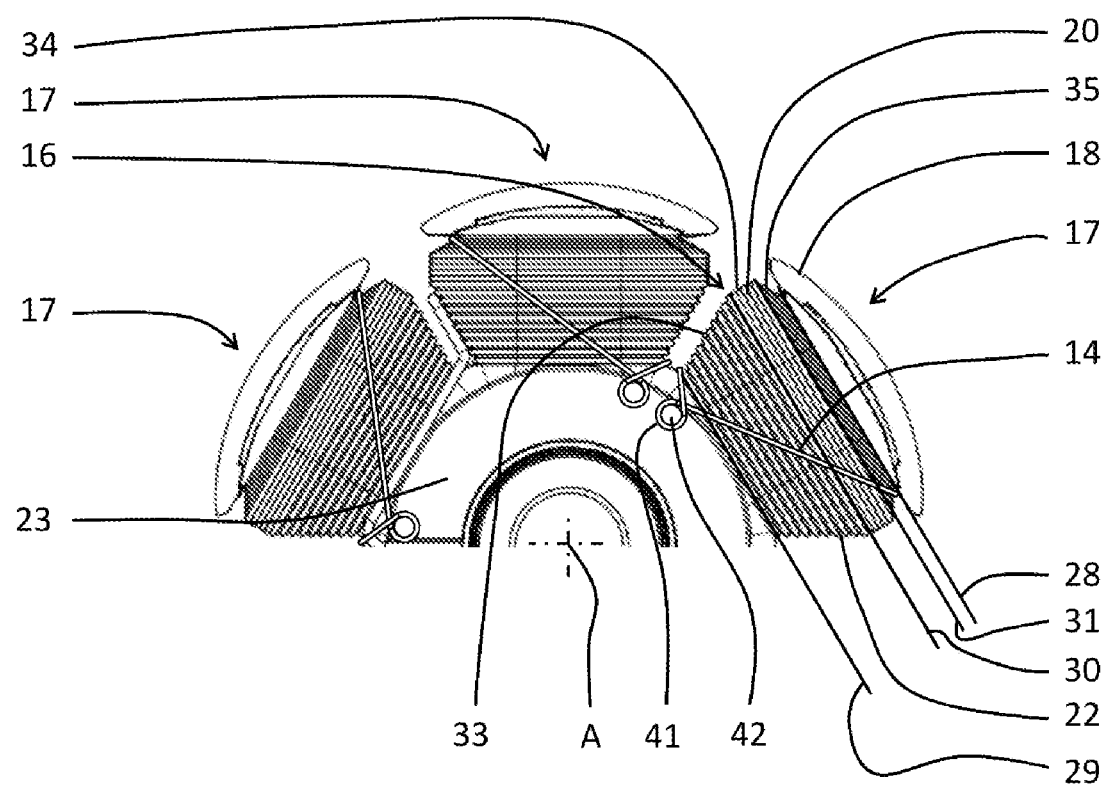
Figure 6:
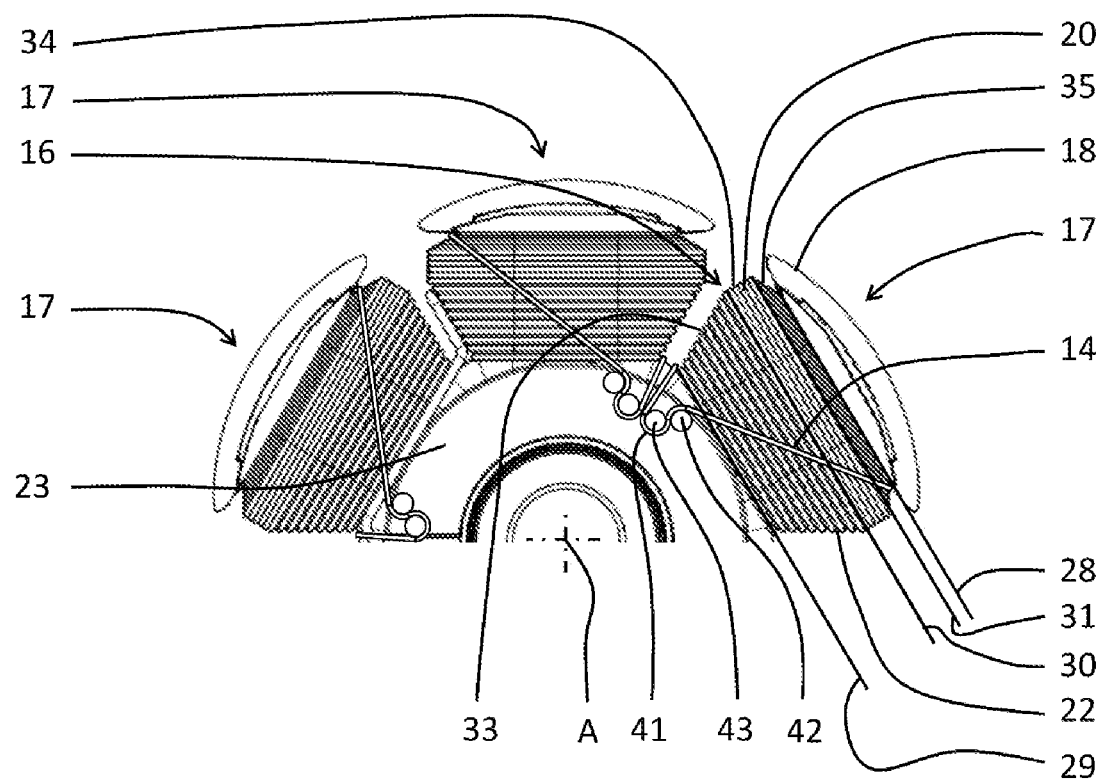

FIG. 2 shows a partial schematic view of a rotor according to a first embodiment of the invention; and FIG. 3 shows a partial schematic cross-section view of a rotor according to the invention; and FIG. 4 shows a partial schematic view of a rotor according to a second embodiment of the invention; and FIG. 5 shows a partial schematic view of a rotor according to a third embodiment of the invention; and FIG. 6 shows a partial schematic view of a rotor according to a fourth embodiment of the invention.

The elements which are identical, similar or analogous retain the same reference from one figure to another. The ordinal numbers are used to differentiate features. They do not define a position of a feature. As a consequence, for example, a third feature of a product does not mean that the product has a first and/or a second feature. The words "axial", "axially" relates to the direction of the axis of rotation A of the rotary electric machine.

FIG. 1 shows a section of a schematically depicted rotary electrical machine 1. The rotary electrical machine 1 comprises a shaft 4 with a rotor 3 sitting thereon. The shaft 4 is for example mounted by means of a first bearing 11 and second bearing 12 so as to be rotatable about an axis of rotation A relative to a stator 2. The stator 2 comprises a stator core 9 and a stator winding 8. For example, the stator core 9 is a laminated stator core 9 comprising several stator plates. The stator core 9 comprises radially oriented stator teeth. Slots are formed between the teeth. The stator winding 8 comprises conductors. The conductors are arranged in the slots. Stator winding ends 10 are electrically connecting the conductors to form the stator winding 8. For instance, the stator winding 8 is a U-Pin type stator winding or a multi-lobed stator winding. For example, the stator winding is three-phase alternating current stator winding or a double three-phase alternating current stator winding.

For example, the first bearing 11 sits in a first bracket 5, and the second bearing 12 sits in a second bracket 6. The first bearing 11 and the second bearing 12 are for instance ball bearings, roller bearings or plain bearings. In the embodiment of FIG. 1, the rotary electric machine includes a housing 32. The housing 32 comprises the first bracket 5, the second bracket 6 and a housing part 7. The housing part 7 connects the first bracket 5 and the second bracket 6. For example, the stator core 9 is press fitted in the housing part 7 in particular, the housing part 7 comprises a cylindrical inner surface in which an outer cylindrical surface of the stator core 9 in press fitted. In another embodiment not shown, the first bracket or the second bracket comprises a first tubular portion in which the stator core is press fitted. The other bracket can comprise a second tubular portion. A cooling chamber can be formed between the first tubular portion and the second tubular portion. In another embodiment not shown, a cooling chamber is formed in the housing part.

The shaft 4 can be rotationally linked to a driving member 13 such as a pulley or a gear wheel.

The rotor 3 is rotationally connected to the shaft 4.

FIG. 2 shows a schematic partial section view perpendicular to the axis of rotation A of a rotor 3 according to a first embodiment of the invention. The rotor 3 is, in particular, a separately excited rotor, also commonly referred as a wound rotor or a slip ring rotor. In this type of rotor, the rotor comprises coils 16 connected to an external power supply through slip rings (not shown). The slip rings correspond to electro-mechanical devices configured to allow the exchange of electric power between a rotating element and a fixed element, here respectively the windings 16 and the external power supply.

The rotor 3 comprises a plurality of electromagnetic poles 17. Each electromagnetic pole comprises a tooth 18 and one coil 16. The tooth 18 comprises a tooth body 19 comprising a magnetic material. The tooth body is for example a laminated tooth body comprising a plurality of steel plate stacked in the direction of the axis of rotation A. The tooth 18 is radially oriented. It comprises a recess 21 as shown in FIG. 3. The coil 16 is arranged in the recess 21. The coil 16 comprises a plurality of wire turns 20 wound around the tooth 18 between a first radial end 28 and a second radial end 29. The turns 20 which are the most distant from the tooth body 19 between the first radial end 28 and the second radial end 29 form outer wire layer 22.

The coil 16 comprises a bracing wire 14. The bracing wire 14 is wound on the outer wire layer 22 from the first radial end 28 to the second radial end 29 in less than one turn around the tooth 18 so as to hold in position the outer wire layer 22. For example, the outer wire layer 22 comprises at least seven turns.

In the embodiments shown in the figures, the coils 16 of adjacent electromagnetic poles 17 are wound in opposite directions.

In another embodiment not shown the coils of adjacent electromagnetic poles are wound in the same direction.

For example, the coil 16 comprises a first coil part 33 starting at the second radial end 29 and ending at a third radial end 30. The third radial end 30 is between the second radial end 29 and the first radial end 28. The size of the turns of the outer wire layer 22 is increasing from the second radial end 29 to the third radial end 30. The first coil part 33 has for example a trapezoidal shape.

The coil 16 comprises for example a second coil part 35 starting at the first radial end 28 and ending at a fourth radial end 31. The fourth radial end 31 is between the first radial end 28 and the third radial end 30. The size of the turns of the outer wire layer 22 increases from the first radial end 28 to the fourth radial end 31. The second coil part 35 has for example a trapezoidal shape.

The coil 16 comprise for example a third coil part 24 starting at the third radial end 30 and ending at the fourth radial end 31. For example, the size of the turns between the third radial end 30 and the fourth radial end 31 are equal.

The tooth body 19 comprises for example a first axial end 39 and a second axial end 40. The coil 16 especially forms coil ends 36 projecting axially from respectively the first axial end 39 and the second axial end 40. The tooth 18 comprises for example a first tooth end plate 38 bearing against the first axial end 39. The tooth 18 comprises for example a second tooth end plate 37 bearing against the second axial end 40.

The first tooth end plate 38 and the second tooth end plate 37 are especially located between the tooth body 19 and the coil ends 36.

For instance, the bracing wire 14 is wound on the outer wire layer 22 from the first radial end 28 to the second radial end 29 at a location axially offset from the first axial end 39 on the side of the first tooth end plate 38.

The rotor 3 comprises a rotor body 15. The rotor body 15 comprises a rotor core 27 and the plurality of the tooth bodies 19 of the electromagnetic poles. For example the tooth bodies 19 are projecting radially.

For example the rotor core is a laminated rotor core comprising a plurality of steel plates stacked in the direction of the axis of rotation A.

In the embodiments shown in the figures, the tooth body 19 of each electromagnetic pole 17 is integral with the rotor core 27. The rotor body 15 is for example a stack of laminations configured to be mounted coaxially on the shaft 4. For example, the rotor body 15 is press-fitted on the shaft 4. The press-fitting of the rotor body 15 on the shaft 4 relies on having an outer circumference of the shaft 4 slightly higher than an inner circumference of the rotor body 15, before proceeding with the press-fitting.

In another embodiment not shown, the rotor core and the tooth bodies are distinct. For example the tooth bodies are secured on the rotor core thanks to a dovetail joint.

For example, the rotor 4 comprises a first end plate 23. For instance, the first end plate 23 comprises the first tooth end plates 38. In the embodiments shown in the figures, the first tooth end plates 38 are molded in one single part forming the first end plate 23. In another example not shown, the first tooth end plates are distinct and are assembled together.

For example, the rotor 4 comprises a second end plate 24. For instance, the second end plate 24 comprises the second tooth end plates 37. For example, the second tooth end plates 37 are molded in one single part forming the second end plate 24. In another example not shown, the second tooth end plates are distinct and are assembled together.

The first end plate 23 and the second end plate 24 provide for example a mechanical holding of the stack of laminations of the rotor body 15.

FIG. 4 shows a second embodiment of the invention. In the second embodiment, the coil 16 comprises for example a tying portion 41 extending from the bracing wire 14 beyond the second radial end 29. In the embodiments shown in the figures, the stator 2 is radially outside the rotor 3 and the tying portion 41 is radially inside the second radial end 29.

In another embodiment not shown the rotor is radially outside the stator and the tying portion is radially outside the second radial end.

The first tooth end plate 38 comprises a first fastening pin 42.

For example the first fastening pin 42 extends in the axial direction.

For example the first tooth end plate is a plastic part and the fastening pin is a globally cylindrical protrusion formed in the first end plate. The tying portion 41 is for example at least partially wound around the first fastening pin 42. The tying portion 41 is for example in contact with one eighth to a half of an angular circumference of the first fastening pin 42.

FIG. 5 shows a third embodiment of the invention. The third embodiment is similar with the second embodiment but the tying portion 41 makes a loop around the first fastening pin 42.

FIG. 6 shows a fourth embodiment of the invention wherein the first tooth end plate 38 comprises a second fastening pin 43 in addition to the first fastening pin 42. The second fastening pin 43 extends for example in the axial direction. The tying portion 41 is at least partially wound around the second fastening pin 43.

For example, the tying portion 41 has a S-shaped path between the first fastening pin 42 and the second fastening pin 43.

The bracing wire 14 is for example wound on the outer layer 22 of the coil end 36 of the coil 16. In the embodiments shown in the figures, the bracing wire 14 is only wound on the outer layer 22 of the coil end 36 of the coil 16. In another embodiment not shown the bracing wire extends on the outer layer exclusively or partially out of the coil end.

The embodiments of electromagnetic poles 17 shown in the figures relates to a rotor of a rotary electric machine wherein the stator 2 is radially outside the rotor 3. In another embodiment not shown the electromagnetic pole is an electromagnetic pole of a rotor of a rotary electric machine wherein the stator is radially inside the rotor.

PART LIST 1 rotary electrical machine
2 stator
3 rotor
4 shaft
5 first bracket
6 second bracket
7 housing part
8 stator winding
9 stator core
10 stator winding end
11 first bearing
12 second bearing
13 driving member
14 bracing wire
15 rotor body
16 coil
17 electromagnetic pole
18 tooth
19 tooth body
20 turn
21 recess
22 outer wire layer
23 first end plate
24 second end plate
28 first radial end
29 second radial end
30 third radial end
31 fourth radial end
32 housing
33 first coil part
34 third coil part
35 second coil part
36 coil end
37 second tooth end plate
38 first tooth end plate
39 first axial end
40 second axial end
41 tying portion
42 first fastening pin
43 second fastening pin

The invention claimed is:

1. An electromagnetic pole for a rotary electric machine with an axis of rotation comprising:
    a tooth comprising a tooth body comprising a magnetic material, in particular a laminated tooth body comprising a plurality of steel plate stacked in the direction of the axis of rotation, the tooth being radially oriented and the tooth comprising a recess,
    a coil arranged in the recess, the coil comprising a plurality of wire turns wound around the tooth between a first radial end and a second radial end,
    the wire turns which are the most distant from the tooth body between the first radial end and the second radial end, forming an outer wire layer,
    the coil comprising a bracing wire, the bracing wire being wound on the outer wire layer from the first radial end to the second radial end in less than one turn around the tooth so as to hold in position the outer wire layer.

2. The electromagnetic pole according to claim 1 wherein the outer wire layer comprises at least seven wire turns.

3. The electromagnetic pole according to claim 1, wherein the coil comprises a first coil part starting at the second radial end and ending at a third radial end, the third radial end being between the second radial end and the first radial end, the size of the wire turns of the outer wire layer increasing from the second radial end to the third radial end.

4. The electromagnetic pole according to claim 3, wherein the coil comprises a second coil part starting at the first radial end and ending at a fourth radial end, the fourth radial end being between the first radial end and the third radial end, the size of the wire turns of the outer wire layer increasing from the first radial end to the fourth radial end.

5. The electromagnetic pole according to claim 1, wherein the tooth body comprises a first axial end and a second axial end and wherein the tooth comprises a first tooth end plate bearing against the first axial end.

6. The electromagnetic pole according to claim 5, wherein the bracing wire is wound on the outer wire layer from the first radial end to the second radial end at a location axially offset from the first axial end on the side of the first tooth end plate.

7. The electromagnetic pole according to claim 5, wherein the coil comprises a tying portion extending from the bracing wire beyond the second radial end, and wherein the first tooth end plate comprises a first fastening pin, the tying portion being at least partially wound around the first fastening pin.

8. The electromagnetic pole according to claim 7, wherein the first fastening pin extends in the axial direction.

9. The electromagnetic pole according to claim 8, wherein the first tooth end plate comprises a second fastening pin extending in the axial direction, the tying portion being at least partially wound around the second fastening pin.

10. The electromagnetic pole according to claim 8, wherein the tying portion has a S-shaped path between the first fastening pin and the second fastening pin.

11. A rotor for a rotary electric machine with an axis of rotation comprising a plurality of electromagnetic poles according to claim 1.

12. The rotor according to claim 11, wherein the number of electromagnetic poles is at least equal to four in particular the number of electromagnetic poles is equal to six.

13. The rotary electric machine with an axis of rotation comprising a rotor according to claim 11.

* * * * *